United States Patent [19]

Lockhart

[11] Patent Number: 4,477,625

[45] Date of Patent: Oct. 16, 1984

[54] ONE PACKAGE, STABLE, MOISTURE CURABLE, ALKOXY-TERMINATED ORGANOPOLYSILOXANE COMPOSITIONS

[75] Inventor: Thomas P. Lockhart, Schenectady, N.Y.

[73] Assignee: General Electric Company, Schenectady, N.Y.

[21] Appl. No.: 481,528

[22] Filed: Apr. 1, 1983

[51] Int. Cl.³ .................. C08G 77/04; C08K 3/34; C08L 83/04
[52] U.S. Cl. .................. 524/789; 524/450; 524/791; 524/863; 528/15; 528/17; 528/18; 528/19; 528/21; 528/33; 528/34; 528/901
[58] Field of Search .................. 528/15, 17, 18, 19, 528/21, 33, 34, 901; 524/789, 791

[56] References Cited

U.S. PATENT DOCUMENTS

| | | | |
|---|---|---|---|
| 2,607,792 | 8/1952 | Warrick | 556/459 |
| 3,035,016 | 5/1962 | Bruner | 528/34 |
| 3,065,194 | 11/1962 | Nitzsche et al. | 524/788 |
| 3,070,559 | 12/1962 | Nitzsche et al. | 523/311 |
| 3,122,522 | 2/1964 | Brown et al. | 528/31 |
| 3,127,363 | 3/1964 | Nitzsche et al. | 428/78 |
| 3,133,891 | 5/1964 | Ceyzeriat | 528/18 |
| 3,153,007 | 10/1964 | Boot | 528/14 |
| 3,161,614 | 12/1964 | Brown | 528/33 |
| 3,184,427 | 5/1965 | Russell et al. | 524/773 |
| 3,240,731 | 3/1966 | Nitzsche et al. | 524/863 |
| 3,296,161 | 1/1967 | Kulpa | 528/34 |
| 3,296,195 | 1/1967 | Goossens | 528/34 |
| 3,334,067 | 8/1967 | Weyenberg | 528/17 |
| 3,438,930 | 4/1969 | Beers | 524/786 |
| 3,518,286 | 6/1970 | Pande et al. | 260/429.7 |
| 3,542,901 | 11/1970 | Cooper et al. | 528/33 |
| 3,632,557 | 6/1972 | Brode et al. | 528/28 |
| 3,647,917 | 3/1972 | Schulz et al. | 528/33 |
| 3,677,996 | 7/1972 | Kaiser et al. | 528/20 |
| 3,689,454 | 9/1972 | Smith et al. | 528/17 |
| 3,779,986 | 12/1973 | Smith et al. | 528/17 |
| 3,819,563 | 6/1974 | Takago et al. | 524/449 |
| 3,872,054 | 3/1975 | Shaw | 528/34 |
| 3,886,118 | 5/1975 | Nitzsche et al. | 528/18 |
| 3,962,160 | 6/1976 | Beers et al. | 528/34 |
| 4,180,642 | 12/1979 | Takago | 528/32 |
| 4,223,122 | 9/1980 | Cella | 528/30 |
| 4,248,993 | 2/1981 | Takago | 528/28 |
| 4,257,932 | 3/1981 | Beers | 528/34 |
| 4,257,957 | 3/1981 | Cella | 260/343.44 |
| 4,294,975 | 10/1981 | Takago | 556/482 |
| 4,301,269 | 11/1981 | Hashimoto et al. | 528/34 |
| 4,302,571 | 11/1981 | Arai et al. | 528/32 |
| 4,304,920 | 12/1981 | Arai et al. | 556/440 |
| 4,323,488 | 4/1982 | Takago et al. | 528/14 |
| 4,339,563 | 7/1982 | Takago et al. | 528/14 |
| 4,362,855 | 12/1982 | Millet et al. | 528/14 |
| 4,395,526 | 7/1983 | White et al. | 528/18 |
| 4,417,042 | 11/1983 | Dziark | 528/22 |

FOREIGN PATENT DOCUMENTS 2640328 8/1976 Fed. Rep. of Germany.

OTHER PUBLICATIONS

Reagents for Organic Synthesis, Fieser et al, J. Wiley, NY, 1967, pp. 703–705, vol. 1.
Advanced Organic Chemistry, 2nd Ed., J. March, McGraw-Hill, 1977, pp. 1184, 923–925, 936–937 and 940.
Chemistry & Technology of Silicones, W. Noll, Academic Press, 1968, pp. 99–100.
Chemistry and Technology of Silicones, W. Noll, Academic Press, New York, 1968, p. 397.
Encyclopedia of Chemical Technology, Kirk-Othmer, 3rd Ed., vol. 13, John Wiley & Sons, New York, pp. 874–893.

Primary Examiner—Herbert J. Lilling
Attorney, Agent, or Firm—William A. Teoli; James C. Davis, Jr.; James Magee, Jr.

[57] ABSTRACT

Stable, substantially acid-free, one package moisture curable alkoxy-terminated organopolysiloxane compositions are provided having a condensation catalyst such as a tin compound, a silicon containing or silicon free organic scavenger for materials having chemically combined hydroxy radicals and certain organo nitrogen accelerators to effect a substantial enhancement in cure rate.

13 Claims, No Drawings

ONE PACKAGE, STABLE, MOISTURE CURABLE, ALKOXY-TERMINATED ORGANOPOLYSILOXANE COMPOSITIONS

CROSS REFERENCE TO RELATED APPLICATIONS

Reference is made to copending application of John E. Hallgren, Ser. No. 277,525, now U.S. Pat. No. 4,377,706 for Polyalkoxysilylenolethers and method for making, White et al, Ser. No. 277,524 now U.S. Pat. No. 4,395,526, for One Package, Stable, Moisture Curable, Polyalkoxy-Terminated Organopolysiloxane Compositions and Method for Making, filed concurrently on June 26, 1981, and John J. Dziark, for Scavengers for One Component Alkoxy Functional RTV Compositions and Process, Ser. No. 349,695 now U.S. Pat. No. 4,417,042, filed Feb. 17, 1982 and application Ser. No. 476, 000, filed Mar. 17, 1983, Swiger et al, for Scavengers For One Component RTV Compositions, filed on or about Mar. 18, 1983, where all of the aforementioned applications are assigned to the same assignee as the present invention and incorporated herein by reference. Reference is also made to the copending application of Mary Ann White et al, Ser. No. 481,524 and my copending application Ser. Nos. 481,529, 481,527 and 481,530, for One Package, Stable, Moisture Curable, Alkoxy-Terminated Organopolysiloxane Compositions, and Ser. No. 481,526, for A Method for Making an Enoxy Stabilized Room Temperature Vulcanizable Organopolysiloxane Composition Which Resists Color Change Upon Aging, where all of these applications are filed concurrently herewith, and also assigned to the same assignee as the present invention and incorporated herein by reference.

BACKGROUND OF THE INVENTION

Prior to the present invention, various one and two-package moisture curable room temperature vulcanizable (RTV) compositions were available based on the use of a silanol-terminated polydiorganosiloxane having the formula,

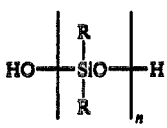

(1)

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor.

Other variations of one-package acyloxy acid generating RTV's are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a cross-linking silane, a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package noncorrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for various commercial uses and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334,067, Cooper et al, U.S. Pat. No. 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. Pat. No. Re. 29,760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one package alkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

In U.S. Pat. No. 4,395,426, filed June 26, 1981, White et al relating to alkoxy functional RTV compositions and process, room temperature vulcanizable compositions are shown based on the use of a polyalkoxy-terminated polydiorganosiloxane having the formula,

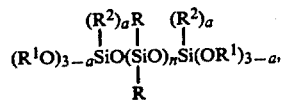
(2)

where R and n are as previously defined, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and a is a whole number equal to 0 to 2 inclusive. The RTV composition of U.S. Pat. No. 4,395,526 further utilize a silicon-containing scavenger for materials having chemically combined hydroxy radical. The silicon containing scavengers can be silanes included within the formula, $$(R^1O)_{4-(b+c)}SiX_c \overset{(R^2)_b}{|} \quad (3)$$

where $R^1$ and $R^2$ are as previously defined, X is a hydrolyzable leaving group selected from amido, amino, carbamato, enoxy, imidato, isocyanato, oximato, thioisocyanato and ureido radicals, b is a whole number equal to 0 or 1, and c is an integer equal to 1 to 4 inclusive and the sum of b+c is equal to 1 to 4 inclusive.

In Ser. No. 481,524, filed concurrently herewith, for Mary Ann White et al, One-Package, Stable, Moisture Curable, Alkoxy-Terminated Organopolysiloxane Compositions, there are shown room temperature vulcanizable organopolysiloxane compositions utilizing a silicon-free scavenger or organic scavenger for chemically combined hydroxy radicals in the RTV composition.

Although valuable results have been achieved by using such silicon containing scavengers or silicon-free organic scavengers for one-package RTV compositions, experience has shown that these one-package RTV compositions often require an extended period of time to achieve a tack-free state upon exposure to atmospheric moisture. Various amine accelerators have been found effective, such as di-n-hexylamine, silyl-substituted guanidines, or nitrogen bases, for example, amidine, aminoxides, aminopyridines, etc. However, none of the aforementioned organic nitrogen compounds were found to be sufficiently vigorous to effect a substantial increase in the cure rate of moisture curable alkoxy containing organopolysiloxane compositions, such as a factor of 4–6 times over that shown for the amine accelerators of the prior art.

The present invention is based on the discovery that certain organo nitrogen compounds, for example di-t-butylethylenediamine (DBEDA) and certain cyclic amidines having at least one chemically combined unit of the formula,

(4)

where the free valences of such unit are satisfied by atoms selected from hydrogen, carbon, silicon and mixtures thereof are highly efficient curing accelerators. For example, there are included in formula (4) such cyclic amidines as 1,5-diazabicyclo[4.3.0]non-5-ene (DBN) and 1,8-diazabicyclo[5.4.0]undec-7-ene (DBU). These particular organo nitrogen compounds have been found to provide a dramatic increase in RTV cure rates when used in combination with a condensation catalyst and either a silicon containing scavenger, or silicon-free organic scavenger, as defined hereinafter as compared to conventional amine accelerators such as di-n-hexylamine. In addition, it also has been found that the organo nitrogen curing accelerators of the present invention can be utilized in further combination with organic amines, such as di-n-hexylamine, to achieve further acceleration in cure rate.

There also can be utilized in the RTV compositions of the present invention cross-linking polyalkoxysilane having the formula,

(5)

where $R^1$, $R^2$ and b are as previously defined.

As a result of the employment of the organo nitrogen accelerators of the present invention in one-package moisture curable alkoxy-terminated organopolysiloxane compositions, RTV compositions are provided which are stable over an extended period of time and which are convertible upon exposure to atmospheric moisture to the tack-free state in a substantially reduced period of time.

STATEMENT OF THE INVENTION

There is provided by the present invention, a one-package, substantially anhydrous, room temperature vulcanizable organopolysiloxane composition stable under ambient conditions in the substantial absence of moisture over an extended period of time and convertible to a substantially acid-free, tack-free elastomer comprising by weight, (A) an organopolysiloxane wherein the silicon atom at each polymer chain end is terminated with at least one alkoxy radical, (B) an effective amount of condensation catalyst (C) from 0 to 0.1 part, per part of the alkoxy terminated organopolysiloxane of (A) of a cross-linking polyalkoxysilane of formula (5) (D) from $1 \times 10^{-5}$ to 0.1 part, per part of the alkoxy terminated organopolysiloxane of an organo nitrogen accelerator selected from the class consisting of di-t-butylethylenediamine, and an amidine having the unit structure of formula (3) and (E) a stabilizing amount of a scavenger for hydroxy radicals selected from
  (i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I and
  (ii) a silicon containing scavenger for hydroxy radicals having a molecular weight in the range of from about 47 to about 5000 which contains a functional unit having the formula,

 (6)

where X is as previously defined, d is a whole number equal to 0 to 4 inclusive, and the remaining valences of Si other than those which can be satisfied by X can be satisfied by atoms selected from Si, H, C, O, N, P, S, transition elements IIIa, IVa, Va, VIa, VIIa and VIII and mixtures thereof, and
  (iii) a zeolite.

Radicals included within R of formulas (1) and (2) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In formulas (1-3), where R, $R^1$, and $R^2$, can be more than 1 radical, these radicals can be the same or different.

The organo nitrogen accelerators utilized in the practice of the present invention are commercially available. In addition, a method for making the di-t-butylethylene diamine is shown by Webb, U.S. Pat. No. 4,160,705, assigned to the same assignee as the present invention. The cyclic amidines are shown in the Chemistry of Amidines and Amidate, S. Patai, (1975), pp. 283-348, John Wiley & Sons, New York. Among the amidines which can be used in the practice of the present invention are material included within the following formula,

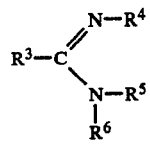

where $R^3$-$R^6$ can be selected from $C_{(1-8)}$ alkyl and alkenyl radicals and $C_{(6-13)}$ aryl radicals. In particular instances $R^4$ and $R^5$, or $R^3$ and $R^4$ can be part of a cyclo alkylene structure. In addition, $R^3$-$R^6$ can include silicon atoms whose valences can be satisfied by monovalent or polyvalent organic radicals. Some of the amidines which can be used in the practice of the present invention are, for example,
  2-ethyl-2-imidazoline,
  2-phenyl-2-imidazoline,
  diaza-1,5-bicyclo[4.3.0]non-5-ene,
  diaza-1,5-bicyclo[5.4.0]undec-5-ene,
  N,N-dimethylbenzamidine,
  N,N'-diphenylacetamidine,
  N,N-di-n-butylbenzamidine, etc.

Some of the cross-linking polyalkoxysilanes included within formula (5) are, for example, methyltrimethoxysilane; methyltriethoxysilane; ethyltrimethoxysilane; tetraethoxysilane; vinyltrimethoxysilane; etc.

Some of the organic scavengers which can be used in the practice of the present invention in combination with the above-described organo nitrogen accelerators are, for example, alkenyl carboxylates, such as isopropenyl acetate, vinyl acetate, but-2-ene-3-yl acetate, isopropenyl propionate and vinyl propionate. Additional examples of organic scavengers are organic acyl stabilizers, such as acetic anhydride, benzoyl anhydride, ketenes, for example, diphenyl ketene, lactones such as methylene butyrolactone, beta-butyrolactone, and epsilon-caprolactone; vinyl ethers such a 4,5-dihydro-2-methylfuran, and carbodiimide derivatives such as cyclohexylcarbodiimide.

Some of the silane scavengers for chemically combined hydroxy radicals included within formula (3) are, for example,
Oximatosilanes such as,
  methyldimethoxy(ethylmethylketoximo)silane;
  methylmethoxybis-(ethylmethylketoximo)silane;
  methyldimethoxy(acetaldoximo)silane;
Carbamatosilanes such as,
  methyldimethoxy(N-methylcarbamato)silane;
  ethyldimethoxy(N-methylcarbamato)silane;
Enoxysilanes such as,
  methyldimethoxyisopropenoxysilane;
  trimethoxyisopropenoxysilane;
  methyltri-iso-propenoxysilane;
  methyldimethoxy8but-2-ene-2-oxy)silane;
  methyldimethoxy(1-phenylethenoxy)silane;
  methyldimethoxy-2(1-carboethoxypropenoxy)silane;
Aminosilanes such as,
  methylmethoxydi-N-methylaminosilane;
  vinyldimethoxymethylaminosilane;
  tetra-N,N-diethylaminosilane;
  methyldimethoxymethylaminosilane;
  methyltricyclohexylaminosilane;
  methyldimethoxyethylaminosilane;
  dimethyldi-N,N-dimethylaminosilane;
  methyldimethoxyisopropylaminosilane;
  dimethyldi-N,N-diethylaminosilane.
Amidosilanes such as, ethyldimethoxy(N-ethylpropionamido)silane;
methylmethoxydi(N-methylacetoamido)silane;
methyldimethoxy(N-methylacetoamido)silane;
methyltri(N-methylacetoamido)silane;
ethyldimethoxy(N-methylacetoamido)silane;
methyltri(N-methylbenzamido)silane;
methylmethoxybis(N-methylacetoamido)silane;
methyldimethoxy(caprolactamo)silane;
trimethoxy(N-methylacetamide)silane.
Imidotosilanes such as,
  methyldimethoxyethylacetimidatosilane;
  methyldimethoxypropylacetimidatosilane.
Ureidosilanes such as,
  methyldimethoxy(N,N',N'-trimethylureido)silane;
  methyldimethoxy(N-allyl-N',N'-dimethylureido)silane;
  methyldimethoxy(N-phenyl-N',N'-dimethylureido)silane.
Isocyanatosilanes such as,
  methyldimethoxyisocyanatosilane;
  dimethoxydiisocyanatosilane.
Thioisocyanatosilanes such as,
  methyldimethoxythioisocyanatosilane;
  methylmethoxydithioisocyanatosilane.

Additional scavenging silanes are, for example, methyltris(N-methylacetamido)-silane; tetra(isopropenoxy)silane. Also included are silane having different leaving groups such as diethylamino(N-methylcarbamato)isopropenoxy(N-allyl-N',N'-dimethylureido) silane.

In addition to the above-described silicon containing scavengers, there is also included within the definition of the silicon containing scavenger having a functional unit of formula (3) silazanes which are more particularly described in the copending application of John J. Dziark, now U.S. Pat. No. 4,147,042, filed Feb. 17, 1982, incorporated herein by reference. Some of these silicon-nitrogen containing scavengers can be more particularly defined as a member selected from:

(A) a silicone-nitrogen compound having the formula, $$(Y)(R''')_2SiNSi(R''')_2Y$$
$$\quad\quad\quad |$$
$$\quad\quad\quad R''$$

where Y is selected from R''' and R''$_2$N-and
(B) a silicon-nitrogen polymer comprising (1) from 3 to 100 mole percent chemically combined structured units selected from the class consisting of units having

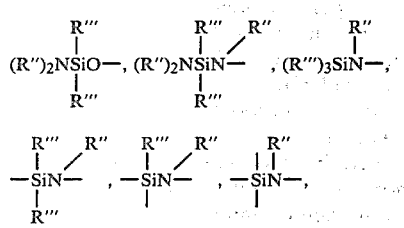

and (2) from 0 to 97 mole percent chemically combined structural units represented by the formula, $$(R''')_c SiO_{\frac{4-c}{2}}$$

and mixtures thereof where the silicon atoms of said silicon-nitrogen polymer are joined to each other by a member selected from an SiOSi- linkage and a SiNR''Si linkage, the free valences of said silicon atoms other than those joined to oxygen to form a siloxy unit and nitrogen to form a silazy unit are joined to a member selected from an R''' radical and (R'')$_2$N radical, and where the ratio of the sum of said R''' radicals and said (R'')$_2$N radicals to the silicon atoms of said silicon-nitrogen polymer has a value of 15 to 3 inclusive, R'' is a member selected from the class consisting of hydrogen and C$_{(1-12)}$ monovalent hydrocarbon radicals, and fluoroalkyl radicals, R''' is a member selected from hydrogen, monovalent hydrocarbon radicals and fluoroalkyl radicals, and c is a whole number equal to 0 to 3 inclusive.

In addition to the above-described silicon containing scavengers, there also can be utilized in the practice of the present invention zeolites which are shown in copending application Ser. No. 481,529, filed concurrently herewith and incorporated herein by reference. Some of these zeolites, or molecular sieves are shown in Reagents for Organic Synthesis, L. F. Fieser and M. Fieser, John Wiley, New York 1967), pages 703–705, Vol. 1. More particularly, molecular sieves are synthetic zeolites of completely regular crystal structure and uniform pore size. Typical molecular sieves which can be utilized are shown by types 3A, 4A, 5A and 13X which are available as powder, 1/16" pellets and ⅛" pellets, or in certain instances available in beads in three sizes. The following shows the compositions of some of these materials.

| Type | Formula | Nominal Pore Diameter |
|------|---------|----------------------|
| 3A | K$_9$Na$_3$[(AlO$_2$)$_{12}$(SiO$_2$)$_{12}$].27H$_2$O | 3A |
| 4A | Na$_{12}$[(AlO$_2$)$_{12}$(SiO$_2$)$_{12}$].27H$_2$O | 4A |
| 5A | Ca$_{4.5}$Na$_3$[(AlO$_2$)$_{12}$].30H$_2$O | 5A |
| 13X | Na$_{86}$[(AlO$_2$)$_{86}$(SiO$_2$)$_{106}$].xH$_2$O | 10A |

In addition to the above shown silane scavengers there are also included within the scope of the present invention silicon containing scavengers as shown in the aforementioned copending application Ser. No. 476,000, filed Mar. 17, 1983 for Swiger et al, such as

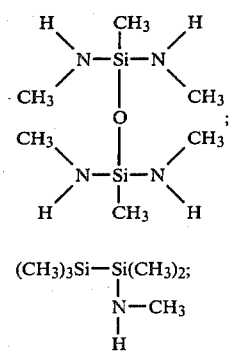

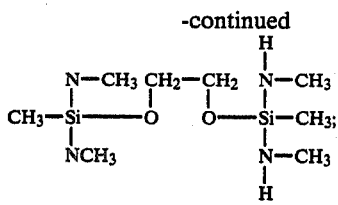

The alkoxy-terminated organopolysiloxane of formula (2), can be made by various procedures. One procedure is taught by Cooper et al U.S. Pat. No. 3,542,901 involving the use of a polyalkoxysilane with a silanol-terminated polydiorganosiloxane in the presence of an amine catalyst. For example, a cross-linking silane of formula (3) can be used in accordance with Cooper et al's method to end-cap a silanol-terminated polydiorganosiloxane of formula (1).

The silanol-terminated polydiorganosiloxanes which can be used to make the polyalkoxyorganopolysiloxanes are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate;.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

Preferably, the room temperature vulcanizable compositions can be made by agitating, for example stirring, a mixture of materials which can consist of the alkoxy-terminated polydiorganosiloxane, organic scavenger, or silane scavenger of formula (3), or mixture thereof, cross-linking silane of formula (5) which can be optional, an organo nitrogen accelerator where the blending is performed in the substantial absence of atmospheric moisture. Thereafter, the condensation catalyst can also be added in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions, a mixture of the polyalkoxy terminated organopolysiloxane, filler, along with an amount of polyalkoxysilane of formula (5) sufficient to effect the substantial elimination of hydroxy functional groups in the mixture. It has been found that a stabilizing amount scavenger for hydroxy radicals in accordance with the practice of the present invention means that there can be used from about 0.1 to about 10 parts of scavenger per 100 parts of the alkoxy-terminated polydiorganosiloxane or the silanol terminated polydiorganosiloxane. Preferably, 1 or 2 parts of scavenger per 100 parts of organopolysiloxane polymer can be used. This "end-capping" procedure can require several minutes, hours, or even days, depending upon such factors as the amount of silanol on the filler, the nature of the $OR^1$ radical on the cross-linking silane, etc. There then can be added to the substantially silanol-free mixture the condensation catalyst, cross-linking silane or mixture thereof, along with other ingredients, for example, the curing accelerator and pigments.

In order that those skilled in the art will be better able to practice the invention, the following examples are given by way of illustration and not by way of limitation. All parts are by weight.

Example 1

A room temperature vulcanizable, one-package polydimethylsiloxane composition was prepared in the absence of moisture utilizing a methyldimethoxysiloxy terminated polydimethylsiloxane having a viscosity of about $15-30 \times 10^3$ centipoise at 25° C., dibutyltindiacetate and an effective amount of an organo nitrogen accelerator as provided in the practice of the present invention. The RTV composition was prepared in an inert atmosphere under substantially anhydrous conditions and samples of the composition were removed and placed in aluminum pans to determine their tack-free times (TFT) in a 58% humidity chamber at room temperature.

In preparing the RTV compositions, there was utilized 100 parts of the methyldimethoxy end-capped polydimethylsiloxane and 0.2 part of dibutyltindiacetate. The following result were obtained, where DBEDA is di-t-butyl-ethylenediamine and DHA is di-n-hexylamine:

TABLE I

| Cure Accelerator | Parts | TFT (in minutes) |
| --- | --- | --- |
| None | — | 145 |
| DHA | 0.6 | 60 |
| DBEDA | 0.6 | <15 |
| DBEDA | 0.3 | <15 |

The above results show that the di-t-butylethylenediamine is a superior curing accelerator than the di-n-hexylamine shown in the prior art.

Example 2

The procedure of Example 1 was repeated, except that additional RTV compositions were prepared utilizing methyldimethoxy-terminated polydimethylsiloxane having a viscosity of about $15-30 \times 10^3$ centipoise at 25° C. (composition A) and the RTV composition as shown in Example 1 (composition B).

In accordance with the procedure of Example 1, a comparison was made utilizing RTV compositions A and B with various organo nitrogen accelerators of the present invention and di-n-hexylamine of the prior art. The following results were obtained where (DBU) is 1,8-diazabicyclo[5.4.0]undec-7-ene and (DBN) is 1,5-diazabicyclo[4.3.0]non-5-ene:

TABLE II

| RTV Composition | Accelerator | Parts | TFT (min) |
| --- | --- | --- | --- |
| A | None | — | 180 |
| A | DHA | 0.6 | 60 |
| A | DBU | 0.3 | 10 |
| B | DBN | 0.3 | 8 |
| B | DBN | 0.1 | 13 |

The above results show that DBU and DBN, the organo nitrogen accelerators of the present invention are markedly superior in enhancing the RTV cure rates as compared to the di-n-hexylamine of the prior art.

Example 3

Several RTV compositions were prepared following the procedure of Example 1 utilizing di-t-butylethylenediamine as an organo nitrogen accelerator. The above RTV compositions also contained an organic scavenger such as beta-butyrolactone and epsilon-caprolactone or silane scavenger such as methyldimethoxyisopropenoxysilane. The RTV composition employing silane scavenger methyldimethoxyisopropenoxysilane used a methyldimethoxy chain-stopped polymer having a viscosity of about 150-200,000 centipoise at 25° C. In addition, there was was also used in this silane scavenger containing RTV composition a trimethylsiloxy stopped polydimethylsiloxane fluid having a viscosity of 50 centipoise.

The RTV compositions containing the organic scavengers were prepared by blending together under substantially anhydrous conditions, 100 parts of a methyldimethoxy-terminated polydimethylsiloxane having a viscosity of $15-30 \times 10^3$ centipoise at 25° C., 0.2 part of dibutyltindiacetate, 0.3 part of di-t-butylethylenediamine and 2 parts of scavenger. The RTV composition containing the silane scavenger was prepared by blending under substantially anhydrous condition, 63 parts of the methyldimethoxy-terminated polydimethylsiloxane, 37 parts of the polydimethylsiloxane fluid having terminal trimethylsiloxy units, 0.2 part of dibutyltindiacetate, 0.3 part of the di-t-butylethylenediamine and 2 parts of silane scavenger.

The above RTV compositions were heat aged at 95° ± 5° C. over a period of 46 hours and the tack-free times, (TFT min) of the respective RTV compositions were then measured. The following results were obtained:

TABLE III

| | (DBEDA) | | |
| --- | --- | --- | --- |
| | TFT (min) | After Heat Aging at 95 ± 5° C. | |
| Scavenger | 0 hr | 21 hr | 46 hr |
| Beta-butyrolactone | 10 | 13 | 31 |
| Epsilon-caprolactone | 10 | 34 | 72 |
| Methyldimethoxy-isopropenoxy silane | 15 | — | 35 |

The TFT of RTV's using beta-butyrolactone and epsilon-caprolactone scavengers with di-n-hexylamine as an accelerator after the same heat age showed the following results:

TABLE IV

| | (DHA) | | |
| --- | --- | --- | --- |
| | TFT (min) | After Heat Aging at 95 ± 5° C. | |
| Scavenger | 0 hr | 21 hr | 46 hr |
| Beta-butyrolactone | 48 | 146 | 137 |
| Epsilon-caprolactone | 25 | 86 | gelled |

The results shown in Tables III and IV establish that superior stability and cure rate can be achieved with stabilized RTV formulations utilizing the organo nitrogen accelerator of the present invention, such as di-t-butylethylenediamine.

Although the above examples are directed to only a few of the very many variables which can be used in the practice of the present invention, it should be understood that the present invention is directed to a much broader variety of RTV compositions based on the use of alkoxy terminated polydiorganosiloxanes of formula (2), silane scavengers of formula (3) polyalkoxysilanes of formula (5) and the organic stabilizers and organo nitrogen accelerators shown in the description preceding these examples. In addition to the previously described stabilizers or scavengers, there also can be used N-silyl substituted imidazoles as shown in copending application Ser. No. 481,530. In addition, where silanol terminated polydiorganosiloxane of formula (1) is used with silicon containing scavenger of formula 3), there can be used 0.001 part to 1 part of polyalkoxysilane, per part of silanol polymer.

What I claim as new and desire to secure by Letters Patent of the United States is:

1. A substantially anhydrous, room temperature vulcanizable organopolysiloxane composition stable under ambient conditions in the substantial absence of moisture over an extended period of time and convertible to a substantially acid-free, tack-free elastomer comprising by weight,
   (A) an organopolysiloxane wherein the silicon atom at each polymer chain end is terminated with at least one alkoxy radical,
   (B) an effective amount of condensation catalyst
   (C) from 0 to 0.1 part, per part of the alkoxy terminated organopolysiloxane of (A) of a cross-linking polyalkoxysilane of the formula

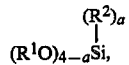
   $(R^1O)_{4-a}Si$, (D) from $1 \times 10^{-5}$ to 0.10 part, per part of the alkoxy terminated organopolysiloxane of an organo nitrogen accelerator selected from the class consisting of di-t-butylethylenediamine and cyclic amidines having at least one chemically combined units of the formula,

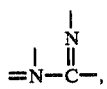

where the free valences of such unit are satisfied by atoms selected from carbon, hydrogen, silicon and mixtures thereof,
   (E) a stabilizing amount of a scavenger for hydroxy radicals selected from
      (i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I and
      (ii) a silicon containing scavenger for hydroxy radicals having a molecular weight in the range of from about 47 to about 5000 which contains a functional unit having the formula,

   $\equiv Si-(X)_d,$ (iii) and a zeolite,
   where X is a hydrolyzable leaving group $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, a is a whole number equal to 0 to 2 inclusive, and d has a value of from 0 to 4 inclusive and the remaining valences of Si other than those satisfied by X can be satisfied by atoms selected from H, Si, C, O and P, S and transition elements IIIa–VIIa and VIII and mixtures thereof.

2. A curable composition in accordance with claim 1, where the organo nitrogen accelerator is di-t-butylethylenediamine.

3. A curable composition in accordance with claim 1, where the organo nitrogen accelerator is 1,8-diazabicyclo[5.4.0]undec-7-ene.

4. A curable composition in accordance with claim 1, where the organo nitrogen accelerator is 1,5-diazabicyclo[4.3.0]non-5-ene.

5. A curable composition in accordance with claim 1, where the alkoxy terminated polydiorganosiloxane is a methyldimethoxy terminated polydimethylsiloxane.

6. A curable composition in accordance with claim 1, where the condensation catalyst is a tin compound.

7. A curable composition in accordance with claim 1, where the organic scavenger is isopropenylacetate.

8. A curable composition in accordance with claim 1, where the polyalkoxysilane is a polymethoxysilane.

9. A curable composition in accordance with claim 1, where the silicon containing scavenger is an alkoxysilazane.

10. A curable composition in accordance with claim 1, where the silicon containing scavenger is a methyldimethoxyisopropenoxysilane.

11. A method for making RTV composition which comprises agitating under substantially anhydrous conditions at a temperature in the range of from 0° C. to 180° C. a room temperature vulcanizable material comprising by weight
   (A) an alkoxy terminated polydiorganosiloxane of the formula,

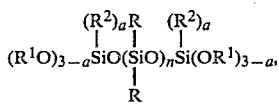

(B) an effective amount of a condensation catalyst, (C) from 0 to 0.1 part per part of the silanol terminated polydiorganosiloxane of a cross-linking polyalkoxysilane of the formula,

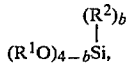

(D) from $10^{-5}$ to 0.15 per part of the silanol terminated organopolysiloxane of an organo nitrogen accelerator selected from the class consisting of di-t-butylethylenediamine and cyclic amidines having at least one chemically combined units of the formula,

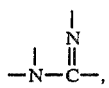

where the free valences of such unit are satisfied by atoms selected from carbon, hydrogen, silicon and mixtures thereof, (E) a stabilizing amount of a scavenger for hydroxy radicals selected from
  (i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I and
  (ii) a silicon containing scavenger for hydroxy radicals having a molecular weight in the range of from about 47 to about 5000 which contains a functional unit having the formula,

(iii) and a zeolite where X is a hydrolyzable leaving group, R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, a is a whole number equal to 0 to 2 inclusive, b is a whole number equal to 0 or 1, n is an integer having a value of from about 50 to about 2500, and d has a value of from 0 to 4 inclusive and the remaining valences of Si other than those satisfied by X can be satisfied by atoms selected from H, Si, C, O and P, S and transition elements IIIa–VIIa and VIII and mixtures thereof.

12. A method for making RTV composition which comprises agitating under substantially anhydrous conditions at a temperature in the range of from 0° C. to 180° C. a room temperature vulcanizable material comprising by weight
  (A) a silanol terminated polydiorganosiloxane,
  (B) an effective amount of a condensation catalyst,
  (C) from 0.001 to 0.1 part per part of the silanol terminated polydiorganosiloxane of a cross-linking polyalkoxysilane of the formula,

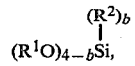

(D) from $10^{-5}$ to 0.15 per part of the silanol terminated organopolysiloxane of an organo nitrogen accelerator selected from the class consisting of di-t-butylethylenediamine and cyclic amidines having at least one chemically combined unit of the formula,

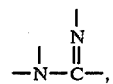

where the free valences of such unit are satisfied by atoms selected from carbon, silicon and mixtures thereof,
  (E) a stabilizing amount of a scavenger for hydroxy radicals selected from
    (i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I and
    (ii) a silicon containing scavenger for hydroxy radicals having a molecular weight in the range of from about 47 to about 5000 which contains a functional unit having the formula,

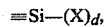

(iii) and a zeolite where X is a hydrolyzable leaving group, R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, a is a whole number equal to 0 to 2 inclusive, b is a whole number equal to 0 or 1, n is an integer having a value of from about 50 to about 2500, and d has a value of from 1 or 2 inclusive and the remaining valences of Si other than those satisfied by X can be satisfied by atoms selected from H, Si, C, O and P, S and transition elements IIIa–VIIa and VIII and mixtures thereof.

13. A method for making RTV composition which comprises agitating under substantially anhydrous conditions at a temperature in the range of from 0° C. to 180° C. a room temperature vulcanizable material comprising by weight
  (A) a silanol terminated polydiorganosiloxane,
  (B) an effective amount of a condensation catalyst, (C) from $10^{-5}$ to 0.15 per part of the silanol terminated organopolysiloxane of an organo nitrogen accelerator selected from the class consisting of di-t-butylethylenediamine and cyclic amidines having at least one chemically combined unit of the formula,

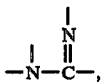

where the free valences of such unit are satisfied by atoms selected from carbon, hydrogen, silicon and mixtures thereof, and (D) a stabilizing amount of a silicon containing scavenger having the formula,

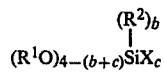

where X is a hydrolyzable leaving group, R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, a is a whole number equal to 0 to 2 inclusive, b is a whole number equal to 0 or 1, c is an integer equal to 1 to 4 inclusive and the sum of b+c is equal to 1 to 4 inclusive, and n is an integer having a value of from about 50 to about 2500.

* * * * *